United States Patent
Rabe

[11] 3,880,325
[45] Apr. 29, 1975

[54] FRANGIBLE SEAL FOR FLUID DISPENSING DEVICE

[75] Inventor: George B. Rabe, Sparta, N.J.

[73] Assignee: Thiokol Chemical Corporation, Bristol, Pa.

[22] Filed: Aug. 16, 1966

[21] Appl. No.: 574,490

[52] U.S. Cl. .............................................. 222/95
[51] Int. Cl. ........................... F23n 1/00; F23r 1/02
[58] Field of Search .................. 222/95, 386.5, 70; 137/564.5; 239/323; 158/50.1; 284/4, 101

[56] References Cited
UNITED STATES PATENTS
2,970,452   2/1961   Beckman et al. .......... 222/386.5 X Primary Examiner—Verlin R. Pendegrass

[57] ABSTRACT

The disclosure is directed to a tank for storing a liquid, such as a propellant for a rocket engine, having a piston with a dynamic seal for slidably engaging the wall of the tank as the piston moves and an hermetic seal inside the dynamic seal to prevent contact of the liquid with the dynamic seal during storage, said hermetic seal is broken by pressure applied to the piston, after which the dynamic seal slides along the wall. In one form the seals are applied at the interior of the piston and around an interior wall of an annular tank and in another form the seals are applied at the exterior of the piston to engage the peripheral wall of a cylindrical tank.

10 Claims, 5 Drawing Figures

INVENTOR.
GEORGE B. RABE

BY

Curtis, Morris & Safford
ATTORNEYS

_Patent 3,880,325_

FRANGIBLE SEAL FOR FLUID DISPENSING DEVICE

This invention relates generally to seals and more particularly to a seal for hermetically isolating dynamic seals from stored corrosive chemicals or from fuels stored in packaged liquid rocket engines.

When such fuels or chemicals are to be used, they are often dispensed from the storage receptacle or tank by means of a movable wall or piston having a sliding fit therein and sealed against leakage by means of dynamic seals. The wall or piston is moved from the storage to the full discharge position by a pressurizing medium such as gas acting on the opposite face of the piston.

Such arrangement has the disadvantage of leakage problems due to manufacturing imperfections, and to long storage periods with deterioration of the dynamic seals exposed to the fluid, and it is therefore desirable to hermetically seal the fuels or chemicals against contact with the dynamic seals. However, such hermetic seals must be frangible and have the disadvantage of sharp broken edges which can damage the dynamic seals during the dispensing or expelling of the fuels or chemicals from their storage tank.

Accordingly, the main object of the present invention is to provide a hermetic seal between a liquid storage tank and its liquid expelling wall or piston which will obviate the above and other disadvantages characterizing known structures.

An important object of the present invention is to provide a novel hermetic seal for liquid storage tanks and their liquid dispensing or expelling pistons, and means for bursting it and removing it from the path of the piston during its liquid expelling movement.

Another important object of the present invention is to provide a hermetic seal between a liquid storage tank and its movable liquid expelling, dynamically sealed wall which is rupturable by the tensile load applied by movement of the wall which is thereafter sealed dynamically to prevent leakage of the fluid behind the wall.

Other objects and advantages of the invention will become apparent during the course of the following description.

In the drawings, one embodiment of the invention is shown. In this showing:

Figure 1:
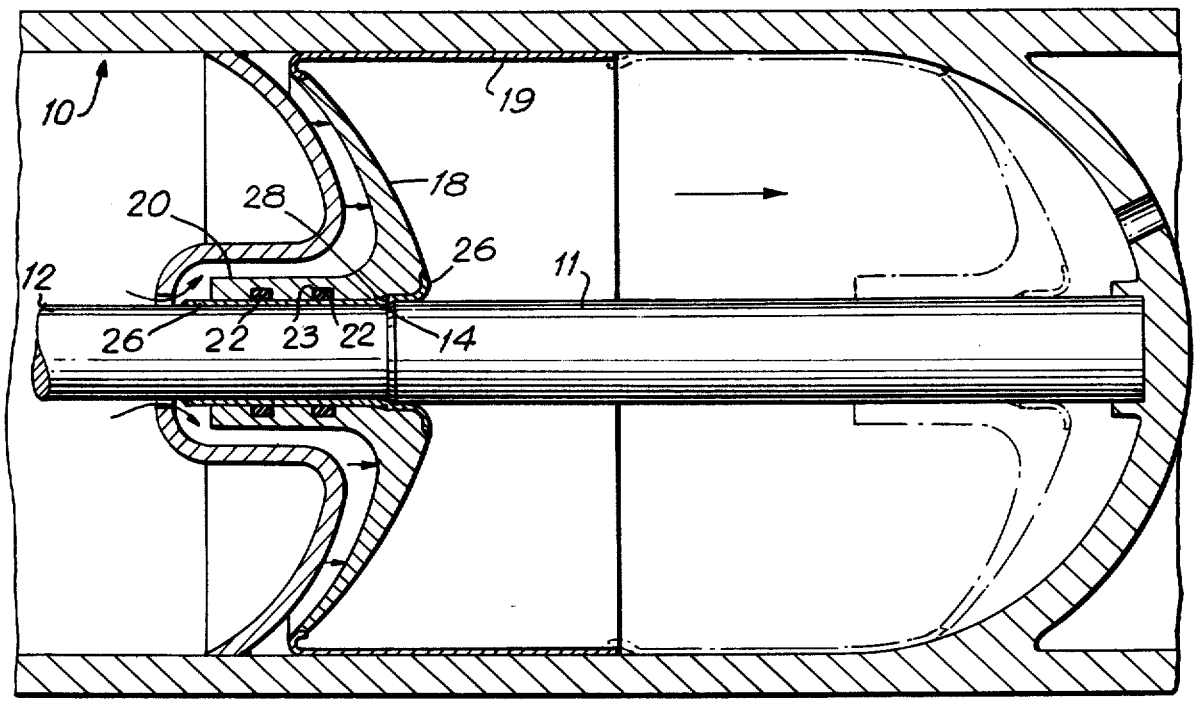
FIG. 1 is a fragmentary, central longitudinal sectional view of the invention applied to an annular tank showing the liquid expelling piston in the storage position.

Referring to the drawings, numeral 10 designates as a whole an annular tank for the storage of liquids which are ultimately to be discharged therefrom by a discharge conduit communicating with a fixed end wall (not shown), the conduit being normally closed by a valve, burst disc, etc., (not shown).

The annular tank 10 is provided with a central, concentric shaft 11 extending longitudinally thereof which includes a reduced diameter portion 12 terminating intermediate its length but adjacent its right end in an inclined shoulder 14. As shown, the right hand end of the tank 10 includes a movable annular wall or piston 18 slidably mounted in the tank 10 on the shaft 11 which may take any of several forms and is illustrated as being annular and rearwardly curved.

The hub 20 of the wall or piston 18 and the shaft 11 (which in effect, is an inner wall of the tank 10) are dynamically sealed with respect to each other by O-rings 22 which are held under compression in their recesses 23. These dynamic seals adequately prevent leakage of the stored liquid during its discharge from the tank 10 but are subject to deterioration from corrosion, etc. by the liquid during long periods of storage. The left end of the hub 20 of the wall 18 is of reduced diameter as at 24 so as to space it from the outer periphery of the central shaft 11, and the reduced portion 12 (which enlargens the diameter of the tank) is similarly spaced from the hub 20.

The stored liquid is isolated from the dynamic seals 22 by a frangible hermetic seal in the form of a sleeve 26 which may be of metal and which is peripherally notched as at 28. The sleeve 26 is placed in the space between the hub 20 and the shaft 11, 12 and is welded or otherwise hermetically sealed to the reduced diameter wall portion 24 at one end and to the reduced shaft portion 12 (or enlarged tank portion) at its other end. It is to be noted that the diameter of the hub 20 is substantially the same but slightly less than that of the non-enlarged inner wall of the tank 12 (shaft 11).

Figure 5:
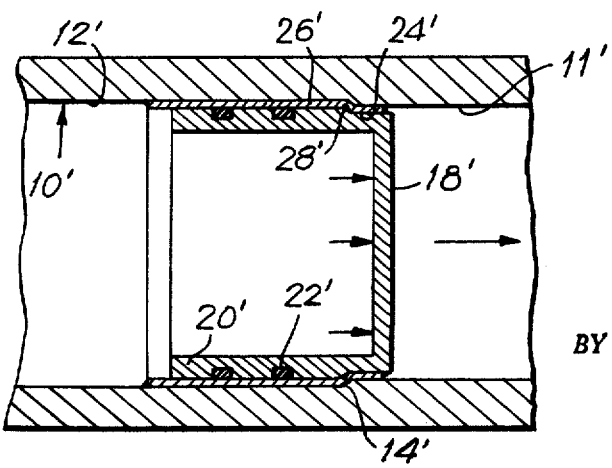
FIG. 5 is a view similar to FIG. 1 but showing the invention applied to a cylindrical tank.

FIG. 5 discloses the invention as applied to a cylindrical tank 10' rather than an annular tank and the operation is the same in either case. The tank 10', of course, employs a cylindrical wall or piston 18' and throughout, similar parts have been designated by similar numerals. It will be apparent that only a single hermetic sleeve 26' is required in FIG. 5 whereas the annular tank and wall of FIG. 1 requires the one disclosed in detail plus a radially outer one. This may be identical with the inner one as indicated in dotted lines by the outer hub 21 which would employ the same seals, etc.

However, as shown, a flexible cylindrical diaphragm 19 may have one end hermetically sealed to the outer tank wall at an intermediate point (not shown) and its other, right end hermetically sealed to the outer periphery of the wall or piston 18. As the wall moves to the left during its liquid expulsion movement, the diaphragm 19 rolls back within itself and maintains the hermetic seal, and has the advantage of providing radial location for and preventing cocking of the wall 18.

OPERATION

Figure 2:
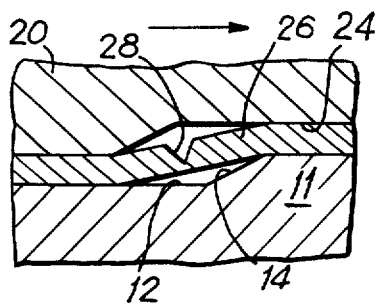
FIG. 2 is a similar fragmentary view thereof to an enlarged scale showing the hermetic seal as installed with the piston in the storage position.

When the liquid in the tank 10 is to be discharged therefrom, a pressurizing medium such as gas from any suitable source (not shown) is directed into the tank from the right against the movable wall or piston 18 at a predetermined pressure. As the pressure builds up across the piston (FIGS. 1, 2 and 5) just prior to forcing its movement to the left, a tensile load is placed on the sleeve 26 comprising the hermetic seal.

Figure 3:
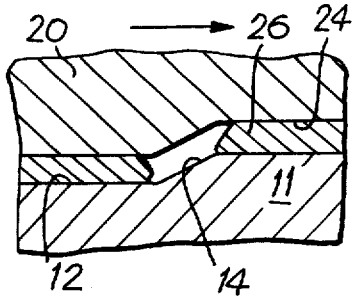
FIG. 3 is a view similar to FIG. 2 showing the rupture of the hermetic seal as the piston commences its liquid expelling movement.
Figure 4:
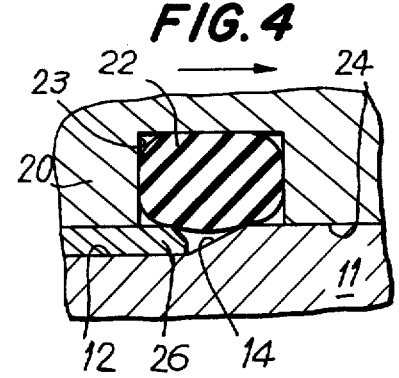
FIG. 4 is a similar view showing the dynamic seal moving into sealing engagement with the wall of the tank.

The peripheral scoring 28 facilitates the rupture of the sleeve which fails under the tensile load of the pressurizing gas and the wall 18 moves to the left (FIG. 3) carrying with it the left end of the sleeve 26. As the wall 18 continues to move, the dynamic seals 22 pass over the left end of the sleeve end welded to the inner wall or shaft 12, over the inclined shoulder 14, and engage the non-reduced inner wall or shaft 11 and function as moving seals (FIG. 4). The piston 18 now moves freely to the left to expel the liquid in the tank 10 from its discharge conduit (not shown).

It is to be noted that the spacing of the movable wall 18 from the inner wall or surface of the tank together with the sloping shoulder 14 and the V-shaped peripheral scoring 28 all combine functionally to ensure that the ragged edges of the hermetic seal are kept out of the path of the dynamic seals 22 so as to prevent damage to the latter.

It is understood that the form of the invention herewith shown and described is to be taken as a preferred example of the same and that various changes in the shape, size and arrangement of parts may be resorted to without departure from the spirit of the invention or the scope of the subjoined claims.

What is claimed is:

1. The combination with a liquid storage tank from which liquid is to be expelled and a wall including dynamic seals mounted for sliding movement on the inner surface of the tank to expel the fluid; of a hermetic seal sealed to the inner surface of the tank and to the movable wall to isolate the liquid from the dynamic seals in the storage position, said hermetic seal being peripherally scored to facilitate rupture thereof by the tensile load applied thereto by movement of the wall with respect to the tank.

2. The combination recited in claim 1 wherein said wall and said tank, respectively, have adjacent portions of reduced and enlarged diameter, and said hermetic seal extends therebetween.

3. The combination recited in claim 2 wherein said hermetic seal is a sleeve.

4. The combination recited in claim 2 wherein said dynamic seals sealably engage the unenlarged portion of said tank upon movement of said wall and rupture of said hermetic seal.

5. The combination recited in claim 4 wherein said hermetic seal is a sleeve.

6. In combination, a tank for the storage of liquids to be expelled therefrom; a wall mounted for sliding movement on the inner surface of the tank to expel the liquid therefrom; dynamic seals mounted between said wall and surface; and a hermetic seal fixed to said surface and said wall to isolate the stored liquid from said dynamic seals to prevent their deterioration during storage, said hermetic seal being peripherally scored to facilitate rupture thereof by the tensile load applied thereto by movement of the wall with respect to the tank.

7. The combination recited in claim 6 wherein said hermetic seal is a sleeve.

8. The combination recited in claim 6 wherein said tank is annular.

9. The combination recited in claim 6 wherein said wall and said tank, respectively, have adjacent portions of reduced and enlarged diameter, and said hermetic seal extends therebetween.

10. The combination recited in claim 6 wherein said dynamic seals sealably engage the unenlarged portion of said tank upon movement of said wall and rupture of said hermetic seal.

* * * * *